US012392253B2

(12) United States Patent
Brusq et al.

(10) Patent No.: US 12,392,253 B2
(45) Date of Patent: Aug. 19, 2025

(54) METHOD FOR MAINTAINING A BLADED WHEEL OF A HIGH-PRESSURE TURBINE OF A TURBOMACHINE

(71) Applicant: SAFRAN AIRCRAFT ENGINES, Paris (FR)

(72) Inventors: Tangi Rumon Brusq, Moissy-Cramayel (FR); Vincent Gérard Michel Moreau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/842,862

(22) PCT Filed: Mar. 8, 2023

(86) PCT No.: PCT/FR2023/050308
§ 371 (c)(1),
(2) Date: Aug. 30, 2024

(87) PCT Pub. No.: WO2023/175256
PCT Pub. Date: Sep. 21, 2023

(65) Prior Publication Data

US 2025/0198299 A1 Jun. 19, 2025

(30) Foreign Application Priority Data

Mar. 18, 2022 (FR) ...................................... 2202428

(51) Int. Cl.
*F01D 11/14* (2006.01)
*F01D 5/30* (2006.01)

(52) U.S. Cl.
CPC ........... *F01D 11/14* (2013.01); *F01D 5/3092* (2013.01); *F05D 2300/17* (2013.01)

(58) Field of Classification Search
None
See application file for complete search history.

(56) References Cited

U.S. PATENT DOCUMENTS 6,502,304 B2 * 1/2003 Rigney .................... F01D 5/20 29/889.22
10,677,074 B2 * 6/2020 Desreumaux .......... F01D 5/005
(Continued)

FOREIGN PATENT DOCUMENTS

JP H02196105 A 8/1990
JP H07247804 A 9/1995

OTHER PUBLICATIONS

Sugita et al—JP H08326503 A +machine translation (Year: 1996).*
(Continued)

*Primary Examiner* — Juan G Flores
(74) *Attorney, Agent, or Firm* — Cozen O'Connor

(57) ABSTRACT

A method for maintaining a bladed wheel of a high-pressure turbine of a turbomachine having a disc with cavities, and blades extending radially from a radially internal root mounted in a cavity of the disc, the root being supported on the disc by means of surfaces of the root and of the disc forming bearing surfaces. At least one foil is removably mounted between the root of at least one blade and the disc, at the corresponding bearing surfaces. The method includes measuring a radial clearance between the tip of at least one blade, meaning the radially external end of the blade, and a shroud of the turbomachine situated facing the bladed wheel, and if the radial clearance is greater than a determined value, removing the foil.

14 Claims, 4 Drawing Sheets

(56) References Cited

U.S. PATENT DOCUMENTS

| | | | | |
|---|---|---|---|---|
| 2002/0170176 | A1* | 11/2002 | Rigney | F01D 5/288 29/889.7 |
| 2009/0016890 | A1* | 1/2009 | Douguet | F01D 5/3092 416/219 R |
| 2009/0060745 | A1* | 3/2009 | Douguet | F01D 5/3007 416/244 R |
| 2017/0234148 | A1* | 8/2017 | Desreumaux | F01D 5/005 415/1 |

OTHER PUBLICATIONS

International Search Report in corresponding International Patent Application No. PCT/FR2023/050308, mailed Jun. 19, 2023, 2 pages, English translation only.

* cited by examiner

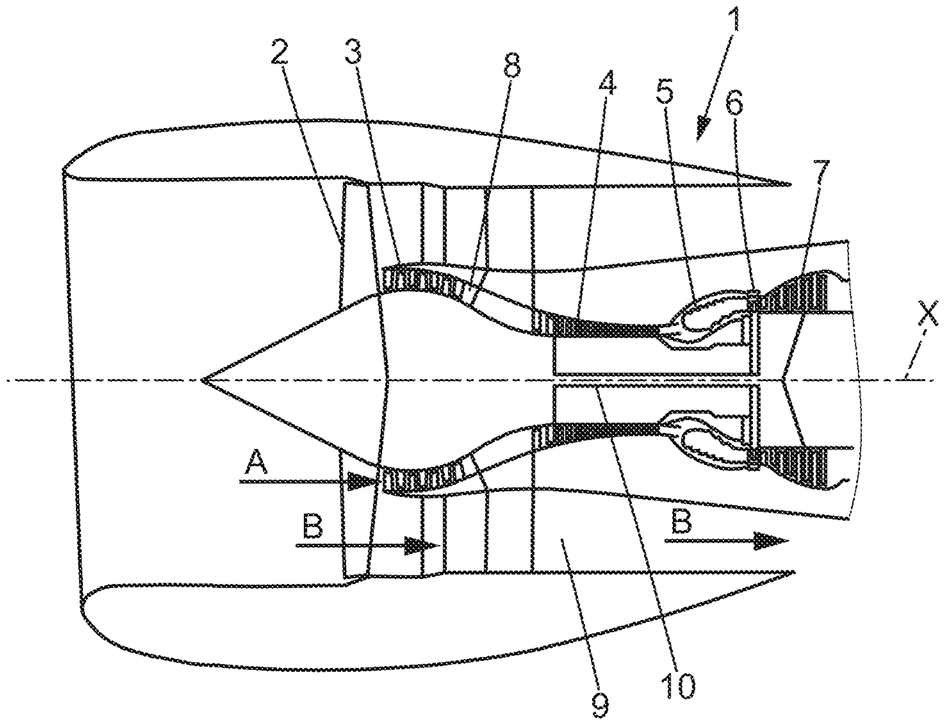
FIG. 1
FIG. 2
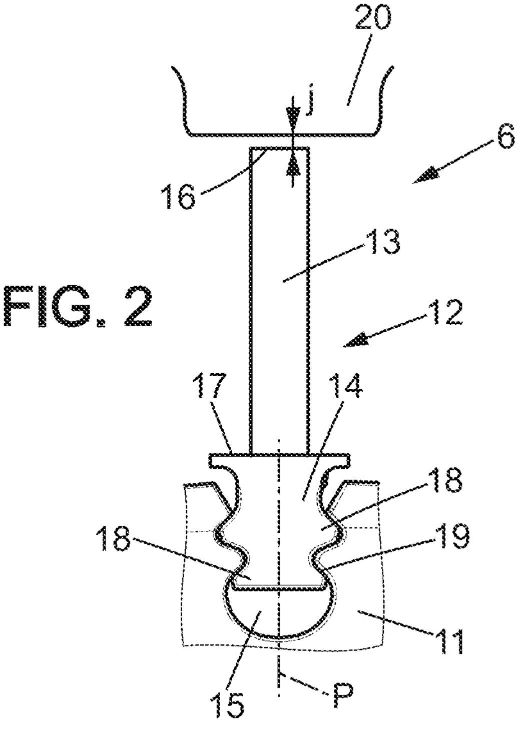

METHOD FOR MAINTAINING A BLADED WHEEL OF A HIGH-PRESSURE TURBINE OF A TURBOMACHINE

CROSS-REFERENCE TO RELATED APPLICATIONS

This application is a US National phase Application of PCT/FR2023/050308 filed Mar. 8, 2023, which claims priority to French Patent Application No. 2202428 filed Mar. 18, 2022, both of which are hereby incorporated in their entirety.

TECHNICAL FIELD OF THE INVENTION

The invention relates to a method for maintaining a bladed wheel of a high-pressure turbine of a turbomachine such as an aircraft turbojet or turboprop engine.

BACKGROUND

FIG. 1 represents a dual-flow double-body turbomachine 1. The axis of the turbomachine is denoted X. In the following, the terms axial and radial are defined in relation to the X axis.

Turbomachine 1 comprises, from upstream to downstream in the direction of the gas flow within turbomachine 1, a fan 2, a low-pressure compressor 3, a high-pressure compressor 4, a combustion chamber 5, a high-pressure turbine 6, and a low-pressure turbine 7.

The air coming from fan 2 is divided into a primary flow A flowing in a primary flow path 8, and a secondary flow B flowing in a secondary flow path 9.

Low-pressure compressor 3, high-pressure compressor 4, combustion chamber 5, high-pressure turbine 6, and low-pressure turbine 7 are arranged in primary flow path 8.

High-pressure turbine 6 and high-pressure compressor 4 are coupled in rotation by means of a first shaft 10 so as to form a high-pressure body.

Low-pressure turbine 7, low-pressure compressor 3, and fan 2 are coupled in rotation by means of a second shaft (not shown) so as to form a low-pressure body.

As is shown in FIG. 2, high-pressure turbine 6 conventionally comprises a disk 11 on which blades 12 are mounted. Each blade 12 comprises an airfoil 13 extending radially outwards from a blade root 14 mounted in a cavity 15 of disc 11.

Tip 16 of blade 12 is formed by the radially external end of blade 12. Root 14 and airfoil 13 are separated here by a radially internal platform 17. Root 14 has the general shape of a fir tree, here with four branches or lobes 18. The shape of cavity 15 is complementary to the shape of root 14.

Each fir-tree branch or lobe 18 rests against an opposing complementary surface of disk 11. The surfaces of root 14 and of disk 11 resting against each other are called bearing surfaces 19. In the embodiment illustrated in FIG. 4, root 14 has four bearing surfaces 19, arranged symmetrically relative to a radial midplane P.

Blades 12 are surrounded by an annular shroud 20. Clearance j is formed between the tips 16 of blades 12 and the shroud 20 surrounding blades 12.

In order to maximize the efficiency of the turbomachine, it is necessary to limit the flow of gas in the clearances located between the tips of the blades and the shroud.

During operation, this clearance tends to increase over time due to two phenomena.

The first phenomenon is wear of the blade tip, generated by friction between the blade tip and the shroud which faces it.

The second phenomenon is thermal erosion, i.e. oxidation, of the blade tip, due to the high temperatures to which the blade is subjected during operation, in particular in the case of a high-pressure turbine.

The increase in this clearance leads to degraded performance of the turbomachine, and as a result, to an increase in fuel consumption and in the operating temperatures of the turbomachine, further aggravating the oxidation phenomenon.

Currently, when a blade is too worn or too oxidized at its tip, it is replaced and scrapped. Such a maintenance operation is therefore very costly and/or leads to unplanned removal of the turbomachine due to performance limits being reached.

SUMMARY

The invention aims to remedy the above problems in a simple, reliable, and inexpensive manner.

To this end, the invention proposes a method for maintaining a bladed wheel of a high-pressure turbine of a turbomachine, extending along an axis, comprising a disc comprising cavities, and blades extending radially and each comprising an airfoil and a radially internal root, the root of each blade being mounted in a cavity of the disc, said root being supported by the disc by means of surfaces of the root and of the disc which form bearing surfaces, characterized in that at least one foil is removably mounted between the root of at least one blade and the disc, at the corresponding bearing surfaces, said method comprising the following steps:

- measuring a radial clearance between the tip of at least one blade, meaning the radially external end of the blade, and a shroud of the turbomachine situated facing the bladed wheel,
- if the radial clearance is greater than a determined value, removing said foil.

The method according to the invention thus aims to determine the state of wear or deformation of the high-pressure turbine by measuring the radial clearance between the blade tip and the shroud, and if the aforementioned radial clearance is too great, removing the foil. Removing the foil then allows reducing the radial clearance between the blade tip and the shroud, so as to return to acceptable performance, at lower cost, without replacing or repairing the blades or the shroud.

At least one foil may be mounted between the root of each blade and the disc, at the corresponding bearing surfaces, all foils being removed if the radial clearance is greater than said determined value.

In this manner, the creation of disparities or "steps" formed by differences in the positioning of the blade tips on the circumference of the turbomachine is avoided. Such steps can generate aerodynamic disturbances impacting the proper functioning of the turbomachine.

The foil may be removably mounted on the blade root.

The foil may be removably mounted on the disc, for example in the cavity or on a tooth of the disc defined between two adjacent cavities.

The foil may comprise a radial abutment surface bearing against a complementary abutment surface of the blade root or of the disc.

Such a feature allows facilitating the correct axial positioning of the foil and also makes it possible to axially retain the foil in position during operation of the turbomachine.

The foil may have a thickness of between 0.1 and 0.9 mm.

The foil may be made of a cobalt-based alloy.

The foil is for example made of an alloy known under the reference MP 159.

The root of the blade may be a root having the general shape of a fir tree.

Each root may have a symmetrical shape relative to a radial midplane.

A single foil may be mounted between the blade root and the disc. This single foil may be inserted between several bearing surfaces of the blade and of the disc.

Several foils may be removably mounted between the root of at least one blade and the disc. In such a case, the foils may be arranged symmetrically relative to the aforementioned radial midplane.

It is also possible to arrange a stack of several foils between the bearing surfaces of the blade root and the bearing surfaces of the disc. In this case, one or more foils may be removed during each maintenance operation.

Each root may have two pairs of bearing surfaces, engaging with two pairs of bearing surfaces of the disc cavity. The root may thus have the shape of a fir tree with four branches or four lobes, such a shape frequently being used in the case of a bladed wheel of a high-pressure turbine. The cavity of course has a shape complementary to that of the root.

The foil may be made by stamping sheet metal or by sintering a metal powder.

The invention also relates to a bladed wheel of a high-pressure turbine comprising a disc comprising cavities, and blades each comprising an airfoil and a root, the root of each blade being mounted in a cavity of the disc, said root being supported by the disc by means of surfaces of the root and of the disc which form bearing surfaces, characterized in that at least one foil is removably mounted between the root of at least one blade and the disc, at the corresponding bearing surfaces.

The bladed wheel is preferably a rotor bladed wheel.

The foil is formed by a thin metal sheet.

The invention also relates to a turbomachine, characterized in that it comprises a bladed wheel of the aforementioned type.

The turbomachine may be an aircraft turbojet or turboprop engine. The aircraft may be an airplane.

BRIEF DESCRIPTION OF FIGURES

FIG. 1 is a schematic section view of a turbomachine of the prior art;

FIG. 2 is a schematic view of part of a high-pressure turbine of the prior art;

DETAILED DESCRIPTION OF THE INVENTION

Figure 3:
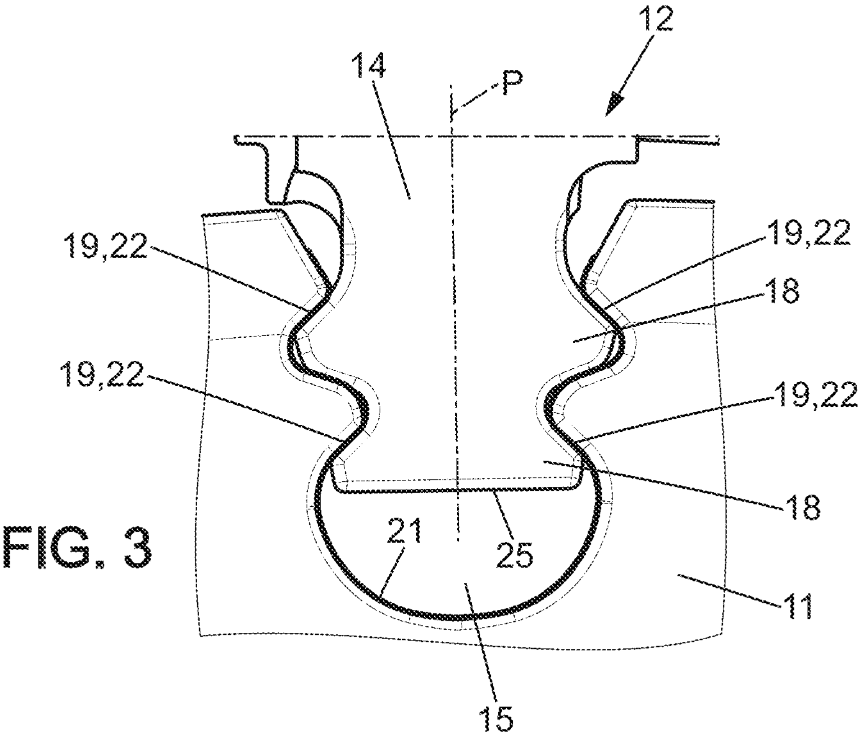
FIG. 3 is a view illustrating the mounting of a blade root in a cavity of a disk of a bladed wheel according to one embodiment of this document.
Figure 4:
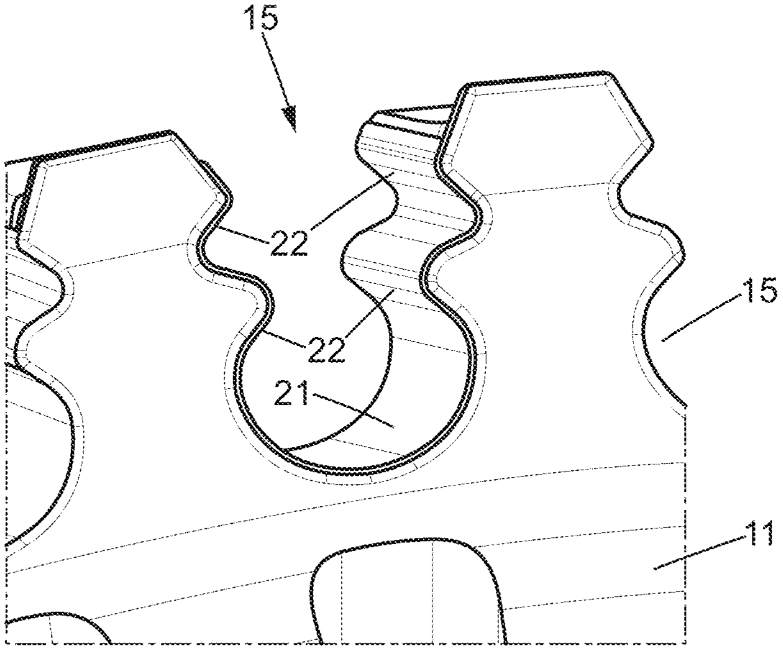
FIG. 4 is a perspective view of a cavity equipped with a foil, according to the embodiment of FIG. 3.

FIGS. 3 and 4 illustrate a rotor bladed wheel 6 of a high-pressure turbine according to one embodiment.

This embodiment differs from the one illustrated in FIG. 2 in that a foil 21 is removably mounted in each cavity 15 and completely or almost completely covers the internal surface of each of cavities 15 of the bladed wheel. Foil 21 thus has a general U shape and has recesses capable of housing lobes 18 of root 14 of the corresponding blade 12. Foil 21 thus has surfaces 22 intended to come into contact with the bearing surfaces of root 14 of blade 12. These surfaces are called the bearing surfaces 22 of foil 21.

Foil 21 is formed by a metal sheet having a thickness of between 0.1 and 0.9 mm, and made of a cobalt-based alloy.

Root 14 of blade 12 comes to rest against bearing surfaces 22 of foil 21 after assembly in cavity 15.

One will note that the radial position of tip 16 of blade 12 takes into account the thickness of foil 21 in its specifications, so as to obtain the desired clearance j.

It is also possible to use two foils 21, located one on either side of midplane P and arranged symmetrically, said foils 21 covering bearing surfaces 19 of cavity 15. Each foil 21 only covers half, or less, of cavity 15.

Figure 5:
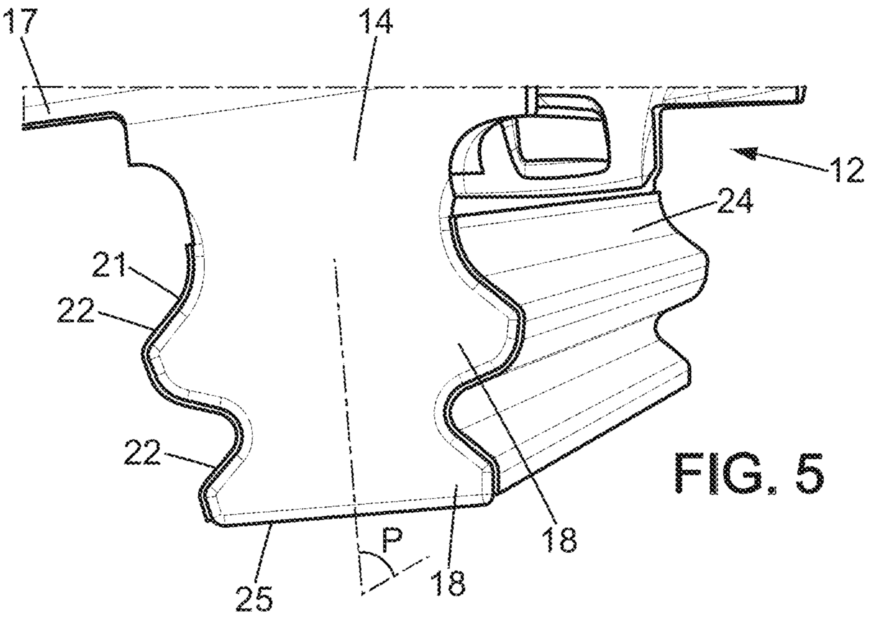
FIG. 5 is a perspective view of a blade root equipped with two side foils, according to another embodiment.

FIGS. 4 and 5 illustrate two embodiments in which foils 21 are removably mounted, not in cavities 15 but on roots 14 of blades 12.

The assembly formed by blade root 14 and foil(s) 21 is then mounted in the corresponding cavity 15 of disc 11.

FIG. 5 illustrates one embodiment in particular in which two side foils 21 are mounted on either side of root 14, symmetrically relative to the radial midplane P. Each foil 21 has a shape complementary to the lateral side of root 14, each foil 21 thus covering the two lateral bearing surfaces 19 concerned of root 14 of blade 12.

Figure 6:
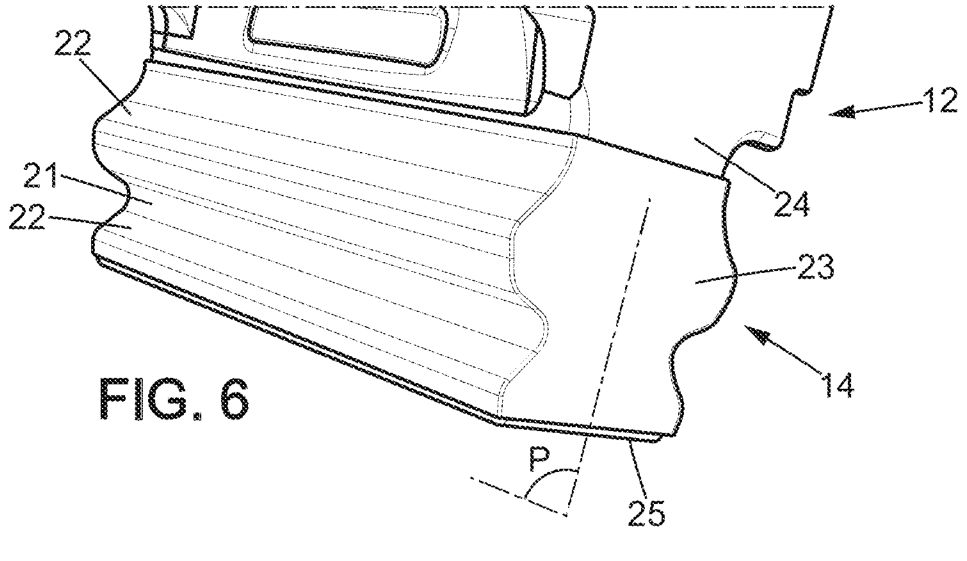
FIG. 6 is a perspective view of a blade root equipped with a single foil, according to another embodiment.

FIG. 6 illustrates an embodiment in which a single foil 21 covers the two lateral sides of root 14 of blade 12, i.e. it covers all of bearing surfaces 19 of root 14.

Foil 21 has a shape complementary to that of root 14 and comprises a radial wall 23 capable of forming an axial abutment which bears against a radial end surface 24 of root 14, which may be an upstream surface or a downstream surface of root 14.

Note that foil 21 does not cover the radially internal end surface 25 of root 14. In fact, channels in blade 12 for the circulation of cooling air have mouths at end surface 25 and it is necessary that these channels not be blocked. Alternatively, foil 21 may cover said radially internal end surface 25 of root 14 but then comprises orifices or openings lined up with the mouths of said channels, to allow the passage of cooling air.

Figure 7:
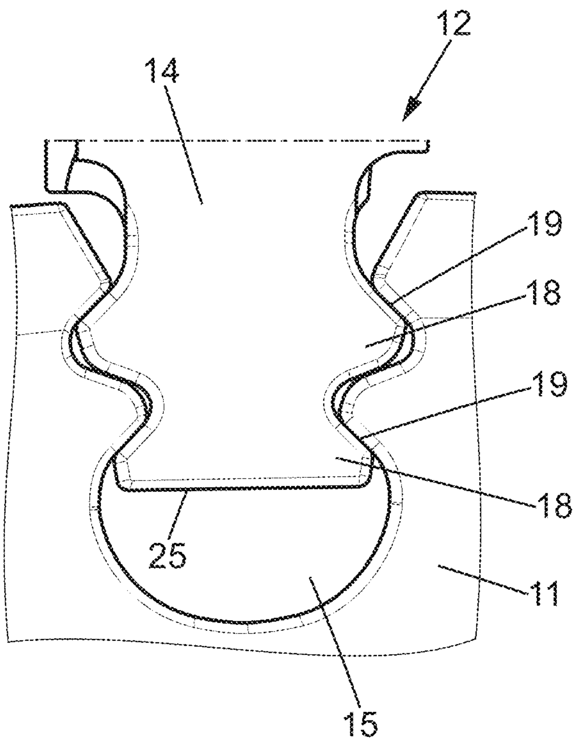
FIG. 7 is a view corresponding to FIG. 3, in which the foil has been removed following a maintenance operation.

As indicated above, this document proposes a method for maintaining such a bladed wheel 6 of a high-pressure turbine, said method comprising a step during which the radial clearance j between tip 16 of blade 12 and shroud 20 is measured, and if this radial clearance j is greater than a determined value, foil(s) 21 are removed, as illustrated in FIG. 7. This has the effect of bringing the blade tip 16 closer to shroud 20, and therefore reducing the clearance j by the value of the thickness of foil 21.

It is thus possible to reduce the clearance j in a simple, rapid, and inexpensive fashion, in a manner that improves the performance of the turbomachine and compensates for the aforementioned wear or corrosion phenomena.

The invention claimed is:

1. A method for maintaining a bladed wheel (6) of a high-pressure turbine of a turbomachine, extending along an axis, comprising a disc (11) comprising cavities (15), and blades (12) extending radially and each comprising an airfoil (13) having a radially external tip and a radially internal root (14), the root (14) of each blade (12) being mounted in a respective cavity (15) of the disc (11), said root (14) being supported by the disc (11) by means of surfaces of the root (14) and of the disc (11) which form bearing surfaces (19), characterized in that at least one foil (21) is removably mounted between the root (14) of at least one blade (12) and the disc (11), at the corresponding bearing surfaces (19), said method comprising the following steps:

measuring a radial clearance (j) between the tip (16) of at least one blade (12), and a shroud (20) of the turbomachine surrounding the bladed wheel, when the radial clearance (j) is greater than a determined value, removing said foil (21).

2. The method according to claim 1, wherein the at least one foil (21) is mounted between the root (14) of each blade (12) and the disc (11), at the corresponding bearing surfaces (19), all foils (21) being removed when the radial clearance (j) is greater than said determined value.

3. The method according to claim 2, wherein the foil (21) is removably mounted on the blade root (14).

4. The method according to claim 2, wherein the foil (21) is removably mounted on the disc (11), in the cavity (15) or on a tooth of the disc (11) defined between two adjacent cavities (15).

5. The method according to claim 2, wherein the foil (21) comprises a radial abutment surface (23) bearing against a complementary abutment surface (24) of the root (14) of the blade (12) or of the disc (11).

6. The method according to claim 2, wherein the foil (21) has a thickness of between 0.1 and 0.9 mm.

7. The method according to claim 2, wherein the foil (21) is made of a cobalt-based alloy.

8. The method according to claim 2, wherein the at least one foil comprises several foils and are removably mounted between the root (14) of a respective blade of the at least one blade (12) and the disc (11).

9. The method according to claim 1, wherein the foil (21) is removably mounted on the blade root (14).

10. The method according to claim 1, wherein the foil (21) is removably mounted on the disc (11), in the cavity (15) or on a tooth of the disc (11) defined between two adjacent cavities (15).

11. The method according to claim 1, wherein the foil (21) comprises a radial abutment surface (23) bearing against a complementary abutment surface (24) of the root (14) of the blade (12) or of the disc (11).

12. The method according to claim 1, wherein the foil (21) has a thickness of between 0.1 and 0.9 mm.

13. The method according to claim 1, wherein the foil (21) is made of a cobalt-based alloy.

14. The method according to claim 1, wherein the at least one foil comprises several foils and are removably mounted between the root (14) of a respective blade of the at least one blade (12) and the disc (11).

* * * * *